(12) United States Patent
Lee et al.

(10) Patent No.: US 11,742,551 B2
(45) Date of Patent: Aug. 29, 2023

(54) BATTERY MODULE INCLUDING MODULE CASE

(71) Applicant: LG CHEM, LTD., Seoul (KR)

(72) Inventors: Hyun-Jong Lee, Daejeon (KR); Choon-Kwon Kang, Daejeon (KR)

(73) Assignee: LG Energy Solution, Ltd., Seoul (KR)

( * ) Notice: Subject to any disclaimer, the term of this patent is extended or adjusted under 35 U.S.C. 154(b) by 387 days.

(21) Appl. No.: 16/971,950

(22) PCT Filed: Dec. 12, 2019

(86) PCT No.: PCT/KR2019/017606
§ 371 (c)(1),
(2) Date: Aug. 21, 2020

(87) PCT Pub. No.: WO2020/145532
PCT Pub. Date: Jul. 16, 2020

(65) Prior Publication Data
US 2021/0091351 A1 Mar. 25, 2021

(30) Foreign Application Priority Data

Jan. 10, 2019 (KR) .................. 10-2019-0003391

(51) Int. Cl.
*H01M 50/502* (2021.01)
*H01M 50/50* (2021.01)
(Continued)

(52) U.S. Cl.
CPC ........... *H01M 50/502* (2021.01); *B60L 50/64* (2019.02); *H01M 50/213* (2021.01);
(Continued)

(58) Field of Classification Search
CPC ............ H01M 50/502; H01M 50/249; H01M 50/242; H01M 50/244; H01M 50/214; H01M 2220/20
See application file for complete search history.

(56) References Cited

U.S. PATENT DOCUMENTS 8,883,336 B2 11/2014 Kim et al.
9,931,961 B2 4/2018 Nusier et al.
(Continued)

FOREIGN PATENT DOCUMENTS

JP 2009-286206 A 12/2009
JP 2010-146879 A 7/2010
(Continued)

OTHER PUBLICATIONS

Office Action dated Apr. 7, 2022, issued in corresponding Chinese Patent Application No. 201980018224.6.
(Continued)

*Primary Examiner* — Christopher P Domone
*Assistant Examiner* — Jonathan William Estes
(74) *Attorney, Agent, or Firm* — Morgan, Lewis & Bockius LLP

(57) ABSTRACT

A battery module that effectively protects internal components from external impact and increases manufacturing efficiency is disclosed. The battery module includes a plurality of can type secondary batteries arranged to be laid down in a horizontal direction; a bus bar at least partially formed of an electrically conductive material to electrically connect the plurality of can type secondary batteries; and a module case in which an inner space is formed to accommodate the plurality of can type secondary batteries, and comprising an outer wall formed to surround the inner space
(Continued)

and a bumper portion configured to protrude from an outer surface of the outer wall in an outer direction to absorb an external impact.

10 Claims, 10 Drawing Sheets

(51) Int. Cl.
*H01M 50/244* (2021.01)
*H01M 50/213* (2021.01)
*H01M 50/249* (2021.01)
*H01M 50/242* (2021.01)
*B60L 50/64* (2019.01)

(52) U.S. Cl.
CPC ....... *H01M 50/242* (2021.01); *H01M 50/244* (2021.01); *H01M 50/249* (2021.01); *H01M 50/50* (2021.01); *H01M 2220/20* (2013.01)

(56) References Cited

U.S. PATENT DOCUMENTS

| | | | |
|---|---|---|---|
| 2010/0156350 A1 | 6/2010 | Murayama et al. | |
| 2013/0260663 A1 | 10/2013 | Kaiyama et al. | |
| 2014/0087221 A1* | 3/2014 | Kim | H01M 50/211 |
| | | | 429/158 |
| 2014/0242429 A1 | 8/2014 | Lee et al. | |
| 2015/0214518 A1 | 7/2015 | Kano | |
| 2015/0222131 A1 | 8/2015 | Kano | |
| 2017/0062782 A1* | 3/2017 | Cho | H01M 50/507 |
| 2017/0291502 A1* | 10/2017 | Kano | H01M 50/24 |

FOREIGN PATENT DOCUMENTS

| | | | |
|---|---|---|---|
| JP | 2013-143207 A | | 7/2013 |
| JP | 2013-199273 A | | 10/2013 |
| JP | 2014-49225 A | | 3/2014 |
| JP | 5617008 B2 | * | 10/2014 |
| JP | 5977975 B2 | | 8/2016 |
| KR | 10-2013-0034596 A | | 4/2013 |
| KR | 10-1447062 B1 | | 11/2014 |
| KR | 10-1658027 B1 | | 9/2016 |
| KR | 10-2016-0141209 A | | 12/2016 |
| KR | 10-2017-0012669 A | | 2/2017 |
| WO | 2012/132186 A1 | | 10/2012 |
| WO | 2013-002507 A2 | | 1/2013 |

OTHER PUBLICATIONS

Extended European Search Report dated May 27, 2021, issued in corresponding European Patent Application No. 19908773.5.
International Search Report issued in corresponding International Patent Application No. PCT/KR2019/017606, dated Apr. 1, 2020.

* cited by examiner

BATTERY MODULE INCLUDING MODULE CASE

TECHNICAL FIELD

The present disclosure relates to a battery module including a module case, and more particularly, to a battery module that effectively protects internal components from external impact and increases manufacturing efficiency.

The present application claims priority to Korean Patent Application No. 10-2019-0003391 filed on Jan. 10, 2019 in the Republic of Korea, the disclosures of which are incorporated herein by reference.

BACKGROUND ART

Currently commercialized secondary batteries include nickel cadmium batteries, nickel hydrogen batteries, nickel zinc batteries, lithium secondary batteries, and the like. Among these secondary batteries, because lithium secondary batteries have almost no memory effect compared to nickel-based secondary batteries, lithium secondary batteries are in the spotlight owing to the advantages of free charge and discharge, very low self discharge rate, and high energy density.

Such a lithium secondary battery mainly uses lithium-based oxides and carbon materials as positive electrode active material and negative electrode active materials, respectively. The lithium secondary battery includes an electrode assembly in which a positive electrode plate and a negative electrode plate coated with a positive electrode active material and a negative electrode active material respectively are arranged with a separator interposed therebetween, and a sheath material, that is, a battery pouch sheath material, that seals and accommodates the assembly together with an electrolyte solution.

Recently, secondary batteries are widely used not only in small devices such as portable electronic devices but also in medium and large devices such as vehicles and energy storage systems. When secondary batteries are used in such medium and large devices, a large number of secondary batteries are electrically connected in order to increase capacity and output power. In particular, pouch type secondary batteries are widely used in such medium and large devices because of advantages such as easy lamination.

Meanwhile, recently, as a need for a large-capacity structure has been increased, including utilization as an energy storage source, a demand for a battery module having a plurality of secondary batteries electrically connected in series and/or in parallel has increased.

In addition, it is common for such a battery pack to be further provided with an external housing formed of a metal material to protect a plurality of secondary batteries from external impact or accommodate and store the plurality of secondary batteries separated from a module case. However, when the external impact occurs, the shape of the external housing formed of the metal material is deformed, and a part of the eternal housing collides or contacts an internal configuration (the module case, a bus bar, a secondary battery, etc.) at a strong force, an internal damage and an internal short circuit are likely to occur. Accordingly, there was a problem in that secondary accidents such as explosion or fire of the secondary battery occurred.

Moreover, in the related art, in a process of inserting the module case into an inner space of the external housing, since damage to the internal components such as the module case and the bus bar is likely to occur, the process of inserting the module case into the external housing is difficult and takes a considerable time. As a result, the manufacturing cost of the battery module has increased.

DISCLOSURE

Technical Problem

The present disclosure is designed to solve the problems of the related art, and therefore the present disclosure is directed to providing a battery module that effectively protects internal components from external impact and increases manufacturing efficiency.

These and other objects and advantages of the present disclosure may be understood from the following detailed description and will become more fully apparent from the exemplary embodiments of the present disclosure. Also, it will be easily understood that the objects and advantages of the present disclosure may be realized by the means shown in the appended claims and combinations thereof.

Technical Solution

In one aspect of the present disclosure, there is provided a battery module including des a plurality of can type secondary batteries arranged to be laid down in a horizontal direction; a bus bar at least partially formed of an electrically conductive material to electrically connect the plurality of can type secondary batteries; and a module case in which an inner space is formed to accommodate the plurality of can type secondary batteries, the module case comprising an outer wall formed to surround the inner space and a bumper portion protruding from an outer surface of the outer wall in an outer direction to absorb an external impact.

The bumper portion may form a separation space from the outer wall of the module case.

The bumper portion may include an extension part protruding and extending from the outer wall of the module case in an outer direction; and a plate-shaped part bent and extending from an end portion of the extension part in an extending direction in a direction corresponding to the outer wall of the module case.

A rib protruding in the outer direction and linearly extending in at least two directions may be provided on an outer surface of the plate-shaped part.

The plate-shaped part may be provided with an inclined surface inclined more in an inner direction toward an outer periphery of the module case.

A part of the bus bar may be located in a separation space between the plate-shaped part of the bumper portion and the outer wall of the module case.

The module case may further include an auxiliary bumper portion protruding from an outer surface of the outer wall in the outer direction in a separation space between the plate-shaped part of the bumper portion and the outer wall of the module case.

The module case may further include a buffer pad having an elastic material in a separation space between the plate-shaped part of the bumper portion and the outer wall of the module case.

The battery module may further include an external housing having a box shape in which an inner space is formed to accommodate the module case, and having an inner surface provided with a projection portion protruding and extending in the inner direction in a position corresponding to the bumper portion.

A guide rail for guiding the module case to be inserted into the external housing may be provided in the inner surface of the external housing.

A guide groove indented in an inner direction and extending long in an up and down direction to be movable in the up and down direction along the guide rail may be formed in a part of the bumper portion.

In another aspect of the present disclosure, there is provided a battery pack including the at least one battery module.

In another aspect of the present disclosure, there is provided a vehicle including the at least one battery pack.

Advantageous Effects

According to an aspect of the present disclosure, a module case is provided with a bumper portion configured to absorb external impact applied to a battery module, and thus when the external impact occurs in the battery module, the bumper portion may preferentially absorb the impact and reduce an amount of impact transferred to an embedded secondary battery. Accordingly, it is possible to increase the stability of the battery module.

In addition, according to an aspect of another embodiment of the present disclosure, the bumper portion is provided with an extension part and a plate-shaped part to secure a distance apart from an outer wall such that the bumper portion may effectively absorb the external impact applied to the battery module. Accordingly, the battery module of the present disclosure may protect the embedded secondary battery from the external impact, thereby effectively preventing fire or explosion.

According to an aspect of the present disclosure, by forming ribs protruding in an outer direction and linearly extending on the outer surface of the plate-shaped part, the bumper portion may effectively reduce the weight or the material cost of the module case according to the addition of the bumper portion and maintaining proper rigidity. Moreover, the ribs may serve as relatively easily breaking and vulnerable parts to exert an excellent function in the impact absorption. For this reason, it is possible to increase the stability of the battery module. Furthermore, a separation space formed by the ribs may be utilized as a free space that may effectively absorb external impact transferred to the plate-shaped part.

Furthermore, according to an aspect of the present disclosure, by forming an inclined surface on the outer surface of the plate-shaped part, the bumper portion may induce an external object colliding with the bumper portion of the module case to miss in the left or right direction along the inclined surface formed in the bumper portion, thereby protecting a plurality of secondary batteries accommodated therein. Accordingly, it is possible to increase the stability of the battery module.

In addition, according to an aspect of the present disclosure, by placing a part of a bus bar in a separation space between the plate-shaped part of the bumper portion of the module case and the outer wall of the module case, the present disclosure may prevent the bus bar from contacting or colliding with an external conductive material and maintain electrical insulation from the outside. Accordingly, when the external impact occurs, a secondary accident due to electric leakage of the battery module may be prevented.

Moreover, according to an aspect of the present disclosure, the battery module of the present disclosure is provided with an auxiliary bumper portion in the separation space between the bumper portion and the outer wall of the module case, and thus the bumper portion and the auxiliary bumper portion may more effectively absorb the external impact applied to the battery module. Accordingly, the secondary battery embedded in the battery module may be protected from the external impact, thereby effectively preventing fire or explosion.

In addition, according to another aspect of the present disclosure, the module case is provided with a buffer pad in the separation space between the plate-shaped part of the bumper portion and the outer wall of the module case, thereby absorbing and buffering the external impact applied to the bumper portion, and thus the impact applied to the plurality of secondary batteries accommodated therein may be effectively reduced.

Further, according to another aspect of the present disclosure, by forming a projection portion protruding and extending in the inner direction in a position corresponding to the bumper portion on the inner surface of the external housing, a force transferred according to the external impact applied to the external housing may be induced to be intensively transferred from the projection portion to the bumper portion formed on the outer wall of the module case. Accordingly, the present disclosure has an effect capable of effectively reducing an amount of impact transferred to the secondary battery which is an internal component as compared with the case where an external impact is applied to other parts of the outer wall of the module case other than the bumper portion.

In addition, according to another aspect of the present disclosure, a guide rail is provided on the inner surface of the external housing, and a guide groove is formed on a part of the bumper portion, and thus the module case may be easily inserted into the external housing, thereby reducing the manufacturing process time. Moreover, the guide rail and the guide groove may effectively reduce the damage to the internal configuration that may occur when misassembled in a process of inserting the module case into the external housing. Accordingly, it is possible to effectively improve the manufacturing efficiency of the battery module.

DESCRIPTION OF DRAWINGS

The accompanying drawings illustrate a preferred embodiment of the present disclosure and together with the foregoing disclosure, serve to provide further understanding of the technical features of the present disclosure, and thus, the present disclosure is not construed as being limited to the drawing.

MODE FOR DISCLOSURE

Hereinafter, preferred embodiments of the present disclosure will be described in detail with reference to the accompanying drawings. Prior to the description, it should be understood that the terms used in the specification and the appended claims should not be construed as limited to general and dictionary meanings, but interpreted based on the meanings and concepts corresponding to technical aspects of the present disclosure on the basis of the principle that the inventor is allowed to define terms appropriately for the best explanation. Therefore, the description proposed herein is just a preferable example for the purpose of illustrations only, not intended to limit the scope of the disclosure, so it should be understood that other equivalents and modifications could be made thereto without departing from the scope of the disclosure.

Figure 1:
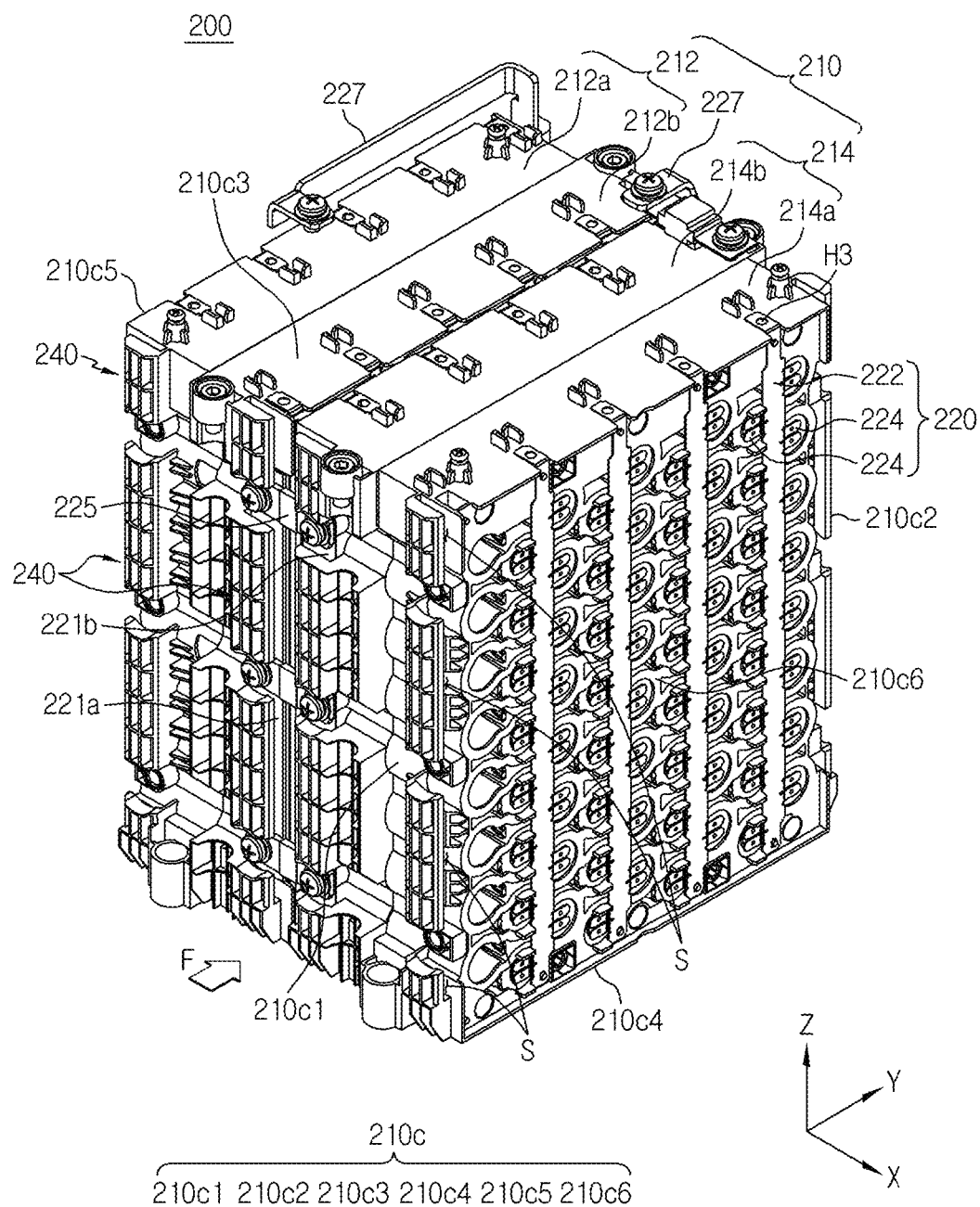
FIG. 1 is a perspective view schematically showing a battery module according to an embodiment of the present disclosure.
Figure 2:
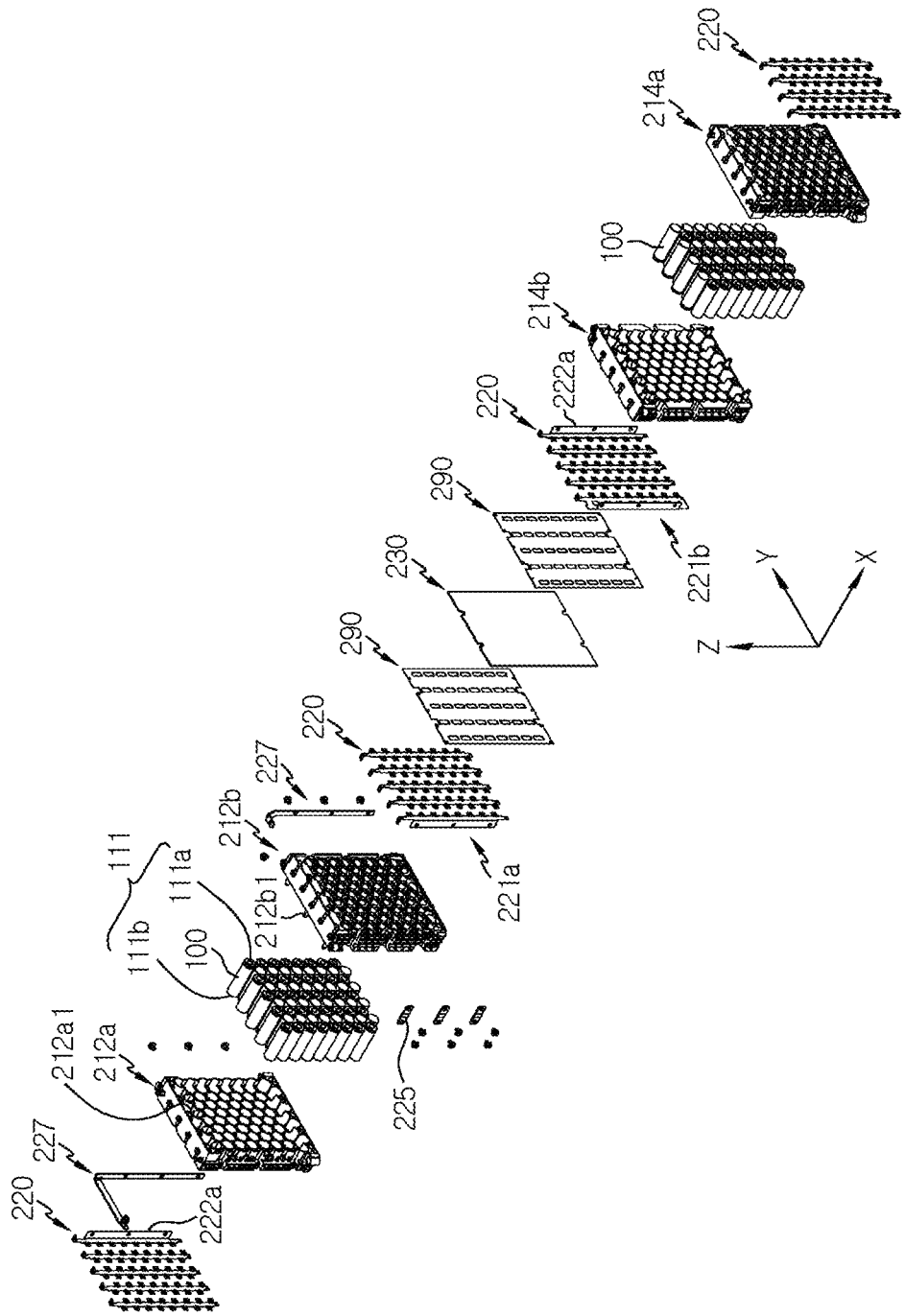
FIG. 2 is an exploded perspective view schematically showing some separated components of the battery module according to an embodiment of the present disclosure.

FIG. 1 is a perspective view schematically showing a battery module according to an embodiment of the present disclosure. FIG. 2 is an exploded perspective view schematically showing some separated components of the battery module according to an embodiment of the present disclosure. In addition, FIG. 3 is a cross-sectional view schematically showing the configuration of a can type secondary battery according to an embodiment of the present disclosure.

Figure 3:
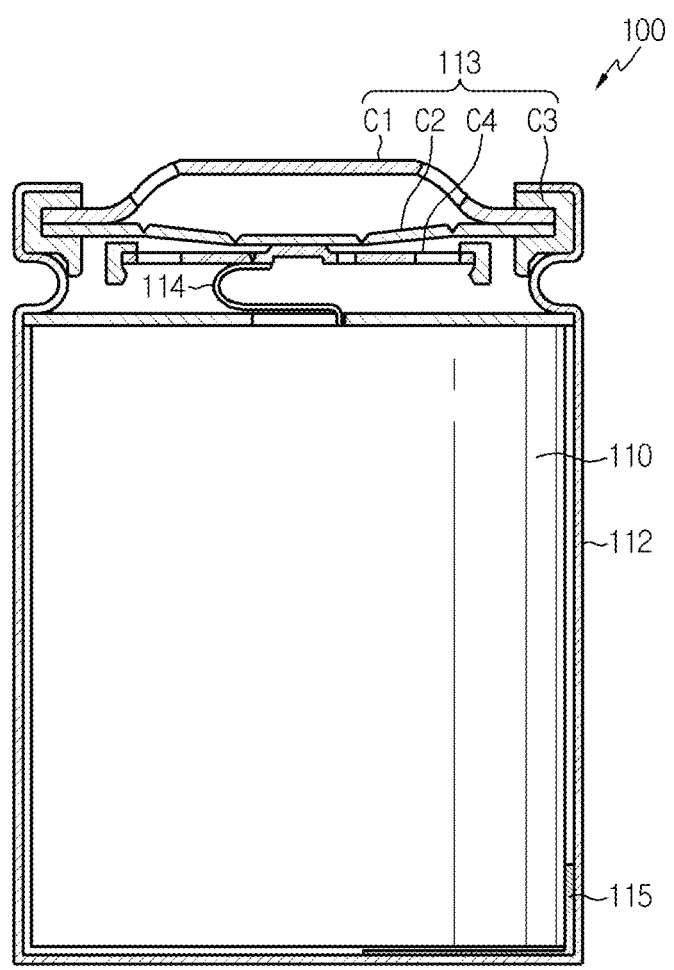
FIG. 3 is a cross-sectional view schematically showing the configuration of a can type secondary battery according to an embodiment of the present disclosure.

Referring to FIGS. 1 to 3, the battery module 200 according to an embodiment of the present disclosure may include a plurality of can type secondary batteries 100, at least one bus bar 220, a module case 210, and an internal plate 230.

Here, the can type secondary battery 100 may include an electrode assembly 110, a battery can 112, and a cap assembly 113.

The electrode assembly 110 may have a structure wound with a separator interposed between a positive electrode plate and a negative electrode plate, a positive electrode tab 114 is attached to the positive electrode plate and connected to the cap assembly 113, and a negative electrode tab 115 is attached to the negative electrode plate and connected to the bottom end of the battery can 112.

The battery can 112 may have an empty space formed therein to accommodate the electrode assembly 110. In particular, the battery can 112 may has a cylindrical or square shape and may be configured with an open top end. In addition, the battery can 112 may be formed of a metal material such as steel or aluminum to secure rigidity and the like. In addition, the battery can 112 may has the bottom end to which the negative electrode tab is attached such that the lower portion of the battery can 112 and the battery can 112 may function as a negative electrode terminal.

The cap assembly 113 may be coupled to the top opening portion of the battery can 112 to seal the open end of the battery can 112. The cap assembly 113 may have a shape such as a circular shape or a square shape according to the shape of the battery can 112, and may include sub-components such as a top cap C1, a safety vent C2, and a gasket C3.

Here, the top cap C1 may be located on the uppermost portion of the cap assembly, may be configured to protrude in the upper direction. In particular, such a top cap C1 may function as a positive electrode terminal 111a in the can type secondary battery 100. Accordingly, the top cap C1 may be electrically connected to another secondary battery 100, a load, or a charging device through an external device, such as a bus bar 220. The top cap C1 may be formed of, for example, a metal material such as stainless steel or aluminum.

The safety vent C2 may be configured to deform when the internal pressure of the secondary battery 100, that is, the internal pressure of the battery can 112, increases to a certain level or more. In addition, the gasket C3 may be formed of a material having electrical insulation such that the edge portions of the top cap C1 and the safety vent C2 may be insulated from the battery can 112.

Meanwhile, the cap assembly 113 may further include a current interrupt member C4. The current interrupt member C4 is also called a current interrupt device (CID). When the internal pressure of the battery increases due to gas generation, and the shape of the safety vent C2 is reversed, a contact between the safety vent C2 and the current interrupt member C4 is broken or the current interrupt member C4 is damaged, and thus the electrical connection between the safety vent C2 and the electrode assembly 110 may be blocked.

The configuration of such a can type secondary battery 100 is well known to those skilled in the art at the time of filing of the present disclosure, and thus a more detailed description thereof will be omitted. In addition, although an example of the can type secondary battery 100 is illustrated in FIG. 3, the battery module 200 according to the present disclosure is not limited to the configuration of a specific type of the can type secondary battery 100. That is, various secondary batteries known at the time of filing of the present disclosure may be employed in the battery module 200 according to the present disclosure.

For example, the can type secondary battery 100 of FIG. 3 is illustrated with respect to the cylindrical secondary battery 100, but the square secondary battery 100 may be applied to the battery module 200 according to the present disclosure.

Referring to FIG. 2 again, the plurality of can type secondary batteries 100 may be provided to be arranged in the front and back direction (Y direction) and the up and down direction (Z direction). For example, as illustrated in FIG. 2, the plurality of can type secondary batteries 100 may be configured to be arranged in the front and back direction. In addition, the plurality of can type secondary batteries 100 may be configured to be arranged in the up and down direction. Moreover, the plurality of can type secondary batteries 100 may be arranged in which tubular shaped portions in a cylindrical battery can (112 in FIG. 3) face each other.

In particular, in the battery module 200 according to the present disclosure, the plurality of can type secondary batteries 100 may be configured to be laid down in a horizontal direction. Here, the horizontal direction means a direction parallel to the ground. That is, as illustrated in FIG. 2, each can type secondary battery 100 may be configured to be elongated in a left and right direction (X-axis direction of the drawing). At this time, in some of the all can type secondary batteries 100, when viewed in the F direction of FIG. 1, the positive electrode terminal 111a and the negative electrode terminal 111b may be located in the left and right directions, respectively. In addition, in the remaining can type secondary batteries 100, the positive electrode terminal 111a and the negative electrode terminal 111b of each can type secondary battery 100 may be located in the right and left directions, respectively.

Meanwhile, the terms indicating directions such as before, after, left, right, up and down described herein may vary depending on the position of an observer or the form in which an object is placed. However, in the present specification, for convenience of description, the directions of front, back, left, right, up, and down are identified and shown with respect to when viewed in the F direction.

Therefore, according to this configuration of the present disclosure, the height of the battery module 200 may be configured to be low. That is, when the can type secondary battery 100 is laid down, the battery module 200 having a shorter up and down height may be configured. Therefore, it is easy to design the battery module 200 having a low height.

Moreover, the bus bar 220 may electrically connect between the plurality of can type secondary batteries 100, such as all of the secondary batteries 100, or some of the secondary batteries 100. To this end, at least a part of the bus bar 220 may be formed of an electrically conductive material. For example, the bus bar 220 may be formed of a metal material such as copper, aluminum, nickel, or the like.

In particular, in the present disclosure, the bus bar 220, as shown in FIG. 2, may be provided with a body portion 222 and the connection portion 224.

The body portion 222 of the bus bar 220 may be configured in a plate shape. Moreover, the bus bar 220 may be configured in the form of a metal plate to ensure rigidity and electrical conductivity. In particular, the body portion 222 may be configured to be erected in the up and down direction (Z-axis direction of the drawing) along the electrode terminals 111 of the plurality of can type secondary batteries 100. That is, in the present disclosure, when the plurality of can type secondary batteries 100 are lengthily laid down in the left and right direction (X-axis direction of the drawing) and arranged in the front and back direction (Y-axis direction of the drawing) and/or the up and down direction (Z-axis direction of the drawing), the electrode terminals 111 of the various secondary batteries 100 may be configured to be arranged in parallel in the front and back direction and the up and down direction. At this time, the body portion 222 may be configured to be erected flat in the front and back direction or the up and down direction as a plate shape according to the arrangement direction of the electrode terminals 111 of the plurality of secondary batteries 100.

Moreover, the body portion 222 of the bus bar 220 may be configured to have an upper end portion bent in the inner direction. In addition, the upper end portion of the body portion 222 of the bus bar 220 may be a portion for sensing a voltage by a sensing member (not shown). Furthermore, a contact hole H3 for connection or contact of the sensing member may be formed in the bent portion of the bus bar 220. For example, as illustrated in FIG. 1, the upper end portion of the body portion 222 may be configured to be bent about 90 degrees toward the inner direction.

Specifically, the connection portion 224 may be configured to contact (join) the electrode terminals 111 of the plurality of can type secondary batteries 100 so as to electrically connect the plurality of can type secondary batteries 100. In addition, a plurality of the connection portions 224 may be formed to extend from the body portion 222 in the front and back direction (Y direction). For example, the connection portions 224 may contact the electrode terminals 111 of some secondary batteries 100 among all the secondary batteries 100 to electrically connect the plurality of secondary batteries 100.

Moreover, the bus bar 220 may contact and connect the same polarity of the plurality of can type secondary batteries 100 in parallel. Alternatively, the bus bar 220 may contact and electrically connect the electrode terminals 111 of some secondary batteries 100 among all the secondary batteries 100 in parallel and in series.

In addition, the battery module 200 may include a connection bus bar 225. Specifically, the connection bus bar 225 may be configured to electrically connect the two or more bus bars 220. For example, as shown in FIGS. 1 and 2, the battery module 200 may be provided with three connection bus bars 225. The connection bus bar 225 may be configured such that one side is connected to a bus bar 221a of one module case 212 and the other side is connected to another bus bar 221b of another module case 214.

Furthermore, the battery module 200 may include an external bus bar 227. Specifically, the external bus bar 227 may serve as a final external input/output electrical terminal of the battery module 200. To this end, the external bus bar 227 may be configured to contact a part of the bus bar (222a in FIG. 2). For example, as illustrated in FIG. 2, the battery module 200 may be provided with two external bus bars 227 that serve as an external input/output positive electrode terminal and an external input/output negative electrode terminal.

Meanwhile, the battery module 200 of the present disclosure may be configured such that the two or more module cases 212 and 214 are electrically connected to each other. Specifically, the battery module 200 may be configured such that the other module case 214 is stacked on the left or right side of the one module case 212. For example, as illustrated in FIG. 1, when viewed in the F direction, the battery module 200 may include a first module case 212 and a second module case 214 located on the right side of the first module case 212.

Furthermore, an empty space may be formed in the module case 210 to accommodate the plurality of can type secondary batteries 100. Specifically, the module case 210 may be provided with an outer wall 210c. The outer wall 210c may be formed to surround the empty space formed therein to accommodate the plurality of can type secondary batteries 100. In addition, when viewed in the F direction of FIG. 1, each of the module cases 212 and 214 may be provided with a first outer wall 210c1, a second outer wall 210c2, a third outer wall 210c3, a fourth outer wall 210c4, a fifth outer wall 210c5, and a sixth outer wall 210c6 that are formed in the front, back, up, down, left, and right directions to form the inner space. For example, as shown in FIG. 1, each of the first module case 212 and the second module case 214 may be provided with the first outer wall 210c1, the second outer wall 210c2, the third outer wall 210c3, the fourth outer wall 210c4, the fifth outer wall 210c5, and the sixth outer wall 210c6.

Accordingly, according to this configuration of the present disclosure, the module case 210 is provided with the outer wall 210c, thereby effectively protecting the plurality of secondary batteries 100 accommodated therein from external impact.

In addition, the at least two can type secondary batteries 100 may be accommodated to be laid down in the horizontal direction (X-axis direction) in the inner space of the module case 210. The stack direction is not necessarily limited to one direction, and may be the up and down direction (Z-axis direction) according to a direction in which the can type secondary battery 100 is laid down. For example, as illustrated in FIG. 2, the at least two or more can type secondary batteries 100 may be accommodated to be laid down in the left and right direction (X-axis direction) in the inner space of each of the first module case 212 and the second module case 214.

In addition, the first module case 212 may be provided with a first frame 212*a* and a second frame 212*b*. Here, the first frame 212*a* and the second frame 212*b* may be configured to meet and join each other in one side and the other side in the left and right direction (X direction). For example, in the configuration of FIG. 5, when viewed in the F direction of FIG. 1, the first frame 212*a* may be disposed on the left side of the plurality of secondary batteries 100 to accommodate the left portions of the plurality of secondary batteries 100. In addition, the second frame 212*b* may be positioned on the right side of the plurality of secondary batteries 100 to accommodate the right portions of the plurality of secondary batteries 100.

In particular, the first frame 212*a* and the second frame 212*b* may be configured to cover one side and the other side of the plurality of secondary batteries 100, respectively, to wholly cover the outer surface of the can type secondary batteries 100 excluding the electrode terminal 111. For example, when the can type secondary battery 100 is the cylindrical secondary battery 100, the first frame 212*a* and the second frame 212*b* wholly cover the outer surface of the cylindrical battery, such that the side surface of the secondary battery 100 in the up and down direction may be configured not to be exposed to the outside of the battery module 200.

Figure 5:
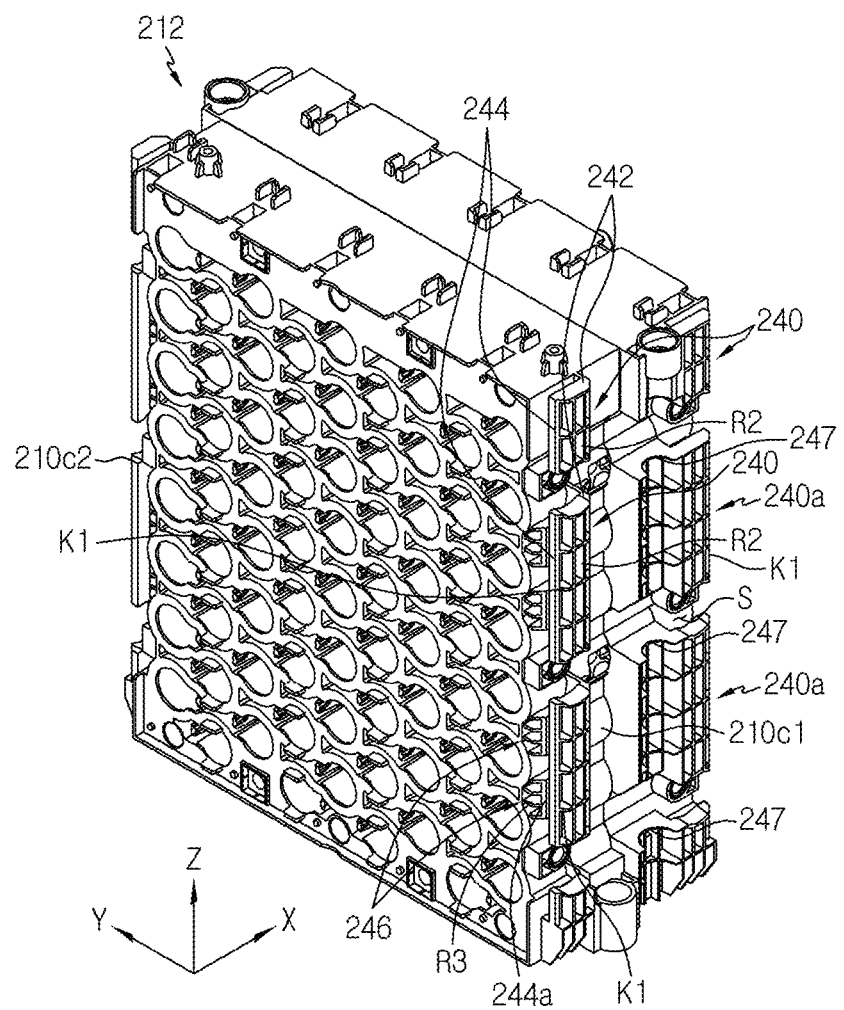
FIG. 5 is a right perspective view schematically showing a module case of a battery module according to an embodiment of the present disclosure.

For example, in the configuration of FIG. 5, the first frame 212*a* may be disposed on the left side of the plurality of secondary batteries 100 to accommodate the left portions of the plurality of secondary batteries 100. In addition, the second frame 212*b* may be positioned on the right side of the plurality of secondary batteries 100 to accommodate the right portions of the plurality of secondary batteries 100.

Likewise, the second module case 214 may be provided with a first frame 214*a* and the second frame 214*b* of the same structure as that of the first frame 212*a* and the second frame 212*b* of the first module case 212.

Therefore, according to this configuration of the present disclosure, since the side exposure of the secondary battery 100 is blocked by the module case 210, the insulating property of the secondary battery 100 may be improved, and the secondary battery 100 may be protected from external physical and chemical factors.

In addition, the second frame 212*b* may be configured to be connected to one side of the first frame 212*a* in the horizontal direction, as shown in FIG. 2. In addition, the first frame 212*a* and the second frame 212*b* may be fixed in a male and female coupling structure. For example, as shown in FIG. 2, a coupling groove 212*a*1 is formed in the first frame 212*a*, and a coupling protrusion 212*b*1 is formed on the second frame 212*b* and thus the coupling groove 212*a*1 and the coupling protrusion 212*b*1 may be coupled to each other.

Furthermore, the second module case 214 may be provided with the first frame 214*a* and the second frame 214*b*. Here, when the first frame 214*a* and the second frame 214*b* are compared with the first frame 212*a* and the second frame 212*b* of the first module case 212 described above, the first frame 214*a* and the second frame 214*b* may have the same configuration, except that the left and right positions of the first frame 214*a* and the second frame 214*b* are reversely arranged. Specifically, when the front and rear positions of the second module case 214 rotate by 180 degrees, the first frame 214*a* and the second frame 214*b* of the second module case 214 may have the same arrangement as the first frame 212*a* and the second frame 212*b* of the first module case 212.

Accordingly, the first frame 214*a* and the second frame 214*b* of the second module case 214 have the same shapes as the first frame 212*a* and the second frame 212*b* of the first module case 212, and thus detailed descriptions of the first frame 214*a* and the second frame 214*b* of the second module case 214 will be omitted.

Figure 4:
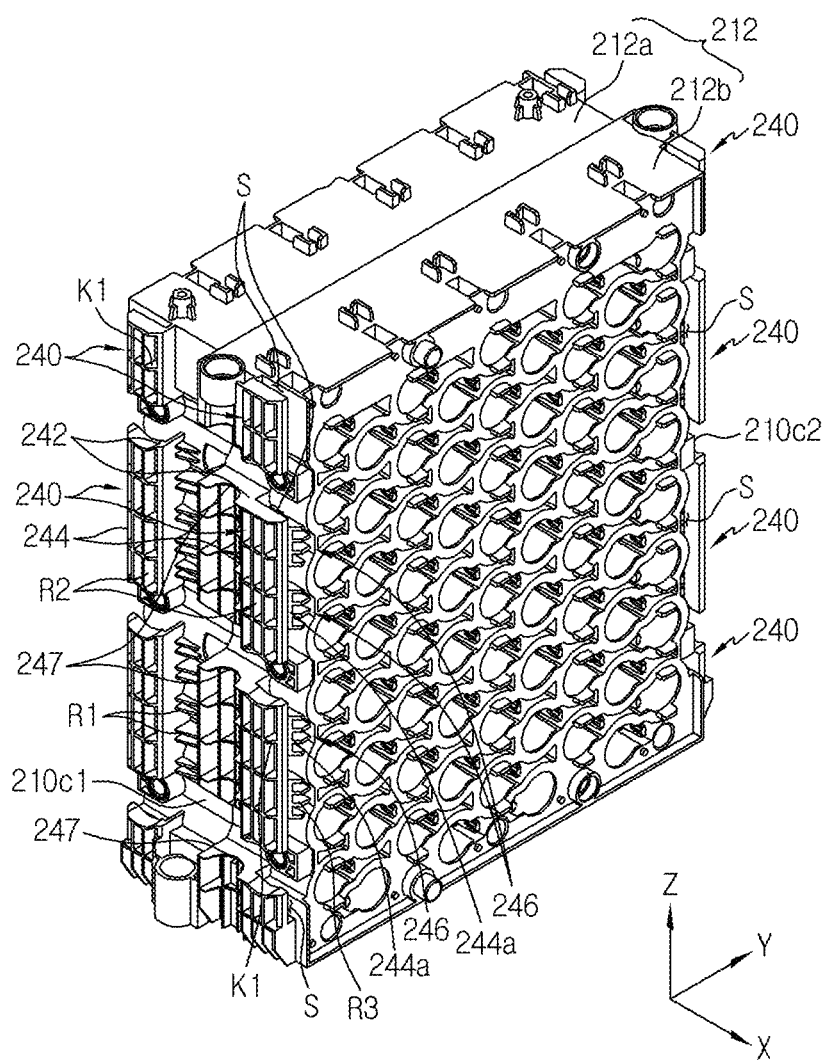
FIG. 4 is a perspective view schematically showing a module case of a battery module according to an embodiment of the present disclosure.

FIG. 4 is a perspective view schematically showing a module case of a battery module according to an embodiment of the present disclosure. FIG. 5 is a right perspective view schematically showing a module case of a battery module according to an embodiment of the present disclosure.

Referring to FIGS. 4 and 5, the module case 210 may be provided with a bumper portion 240 to absorb external impact applied to the battery module 200. Specifically, the bumper portion 240 may be formed on an outer wall 210*c*1 of the module case 210. For example, as illustrated in FIGS. 4 and 5, the bumper portion 240 may be formed on each of the front outer wall 210*c*1 and the rear outer wall 210*c*2 of the module case 210.

In addition, the bumper portion 240 may be configured to protrude in an outer direction from the outer surface of the outer wall 210*c*. For example, as illustrated in FIG. 4, eight bumper portions 240 formed to protrude forward from the front outer wall 210*c*1 of the module case 212 may be formed. In addition, although not shown in the drawing, eight bumper portions 240 formed to protrude rearward from the rear outer wall 210*c*2 of the module case 212 may be formed.

In addition, the bumper portion 240 may be configured to form a separation space from the outer wall 210*c* of the module case 210. That is, the bumper portion 240 may have a space S apart from the outer wall 210*c* by a predetermined distance. For example, as illustrated in FIG. 4, each of the eight bumper portions 240 may have the space S apart from the front outer wall 210*c*1 of the module case 212. In addition, although not shown in the drawing, a plurality of bumper portions 240 formed to protrude rearward from the rear outer wall 210*c*2 of the module case 212 may be formed. Moreover, each of the bumper portions 240 provided on the rear outer wall 210*c*2 may have the space S apart from the rear outer wall 210*c*2 of the module case 212.

In this regard, the bumper portion 240 secures a distance apart from the outer wall 210*c* of the module case 210, and thus external impact applied to the battery module 200 is not directly transferred to the embedded secondary battery 100, and the bumper portion 240 may preferentially collide with the outer wall 210*c* to cause the bumper portion 240 to absorb more external impact.

Accordingly, according to this configuration of the present disclosure, the module case 210 is provided with the bumper portion 240 configured to absorb the external impact applied to the battery module 200, and thus when the external impact occurs in the battery module 200, the bumper portion 240 may preferentially absorb the impact to protect the embedded secondary battery 100. Accordingly, the stability of the battery module 200 may be increased.

In addition, the bumper portion 240 may have an extension part 242 and a plate-shaped part 244. Here, the extension part 242 may have a shape protruding and extending in the outer direction from the outer wall 210*c* of the module case 210. Specifically, the extension part 242 may be configured to separate the plate-shaped part 244 apart from the outer wall 210c of the module case 210 by a predetermined distance. The bumper portion 240 secures a distance apart from the outer wall 210c of the module case 210, and thus the external impact applied to the battery module 200 is not directly transferred to the embedded secondary battery 100, and the bumper portion 240 may preferentially collide to cause the bumper portion 240 to absorb more external impact.

In addition, the plate-shaped part 244 may have a shape curved and extending from an end portion of the extension part 242 in the extension direction to a direction corresponding to the outer wall 210c of the module case 210.

Therefore, according to this configuration of the present disclosure, the bumper portion 240 is provided with the extension part 242 and the plate-shaped part 244 to secure the distance apart from the outer wall, and thus the bumper portion 240 may effectively absorb the external impact applied to the battery module 200. Accordingly, the secondary battery 100 embedded in the battery module 200 is protected from the external impact, thereby effectively preventing fire or explosion.

Further, a linear rib R2 may be formed on the outer surface of the plate shape in the plate-shaped part 244. Specifically, the rib R2 may protrude in the outer direction and linearly extend in at least two directions. For example, as shown in FIGS. 4 and 5, when viewed from the F direction of FIG. 1, the linear ribs R2 may have a lattice shape in which the linear ribs R2 extending in the left and right direction (X direction) and the up and down direction (Z direction) intersect each other.

Furthermore, the plate-shaped part 244 may have a separation space formed by the rib R2 on the outer surface. That is, the plate-shaped part 244 may have the separation space corresponding to a size protruding in the outer direction between the rib R2 and the other rib R2. Alternatively, when the ribs R2 extend in the lattice shape, the plate-shaped part 244 may have the separation space as much as a size protruding in the outer direction every between the ribs R2 of a lattice pattern.

Therefore, according to this configuration of the present disclosure, by forming the ribs R2 protruding in the outer direction and linearly extending on the outer surface of the plate-shaped part 244, the bumper portion 240 may effectively reduce the weight or the material cost of the module case 210 according to the addition of the bumper portion 240 and maintaining proper rigidity. Moreover, the ribs R2 may serve as relatively easily breaking and vulnerable parts to exert an excellent function in the impact absorption. For this reason, it is possible to increase the stability of the battery module 200. Furthermore, a separation space formed by the ribs R2 may be utilized as a free space that may effectively absorb the external impact transferred to the plate-shaped part 244.

In addition, the plate-shaped part 244 may have a curved surface such that the center of the body protrudes convexly on the outer surface in the outer direction. Furthermore, the plate-shaped part 244 may have a plate shape in which the center of the body is convexly curved in the outer direction. For example, as illustrated in FIG. 5, in the plate-shaped part 244 of a partial bumper portion 240a, the plate-shaped part 244 may also have a curved surface in which the center of the body convexly protrudes forward. The plate-shaped part 244 may also have a plate shape in which the center of the body is convexly curved forward.

In addition, an inclined surface K1 inclined in the inner direction may be formed in the plate-shaped part 244. Specifically, the inclined surface K1 may be more inclined in the inner direction in the plate-shaped part 244 toward the outer periphery of the outer wall 210c of the module case 210. That is, the inclined surface K1 may have a shape in which the thickness of the plate-shaped part 242 becomes smaller toward the outer periphery of the plate-shaped part 242. For example, referring to FIGS. 4 and 5, in the eight bumper portions 240, the inclined surface K1 which is adjacent to the outer periphery of the outer wall 210c1 of the module case 212 and which is inclined backward in the left end portion of the outer surface of the plate-shaped part 242, the right end portion, or the left end portion and the right end portion may be formed.

Therefore, according to this configuration of the present disclosure, by forming the inclined surface K1 on the outer surface of the plate-shaped part 244, the bumper portion 240 may induce an external object colliding with the bumper portion 240 of the module case 210 to miss (obliquely pass by) in the left or right direction along the inclined surface K1 formed on the bumper portion 240, thereby protecting the plurality of secondary batteries 100 accommodated therein. Accordingly, the stability of the battery module 200 may be increased.

Figure 6:
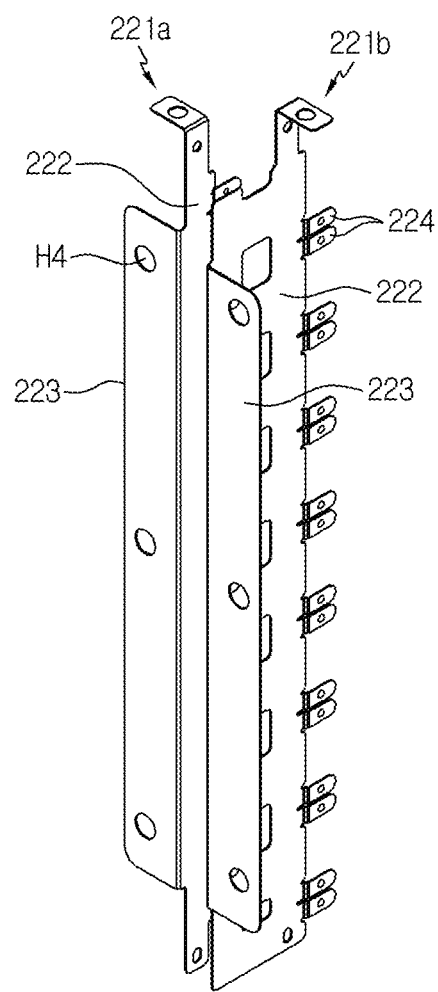
FIG. 6 is a right perspective view schematically showing some bus bars of a battery module according to an embodiment of the present disclosure.

FIG. 6 is a right perspective view schematically showing some bus bars of a battery module according to an embodiment of the present disclosure.

Referring back to FIG. 6 together with FIGS. 4 and 5, the bus bar 221a mounted on the one module case 212 may be provided with an expansion portion 223 so as to be connected to the bus bar 221b mounted on the other module case 214. The expansion portion 223 may have a shape extending from the body portion 222 of the bus bar 220 in a perpendicular direction. A coupling hole H4 for bolt fastening the connection bus bar 225 may be formed in the expansion portion 223. The expansion portion 223 may be coupled to the connection bus bar 225 to electrically connect the plurality of secondary batteries 100 mounted on each of the two module cases 212 and 214.

For example, as shown in FIG. 6, each of the two bus bars 221a and 221b provided in the two module cases 212 and 214 may further include the expansion portion 223 unlike the other bus bar 220. The expansion portion 223 may have a shape curved in the left or right direction from the body portion 222 of the bus bar 220. In addition, three coupling holes H4 for bolt fastening may be formed in the expansion portion 223.

A part of the bus bar 220 may be positioned in the space S apart between the plate-shaped part 244 of the bumper portion 240 and the outer wall 210c of the module case 210. Here, the part of the bus bar 220 may be the expansion portion 223. For example, the expansion portion 223 of the bus bar 220 may be positioned in the space S apart between the plate-shaped part 244 of the bumper portion 240 and the outer wall 210c of the module case 210. For example, as shown in FIGS. 1 and 2, the expansion portions 223 of the two bus bars 221a and 221b may be positioned between the plate-shaped part 244 of the bumper portion 240 and the front outer wall 210c1 of the module case 210.

Therefore, according to this configuration of the present disclosure, a part of the bus bar 220 is configured to be positioned in the space S apart between the plate-shaped part 244 of the bus bar 220 and the outer wall 210c of the module case 210, and thus the bumper portion 240 of the module case 210 may prevent contact or collision with an external conductive material and maintain an electrical insulation from the outside. Accordingly, when an external impact occurs, a secondary accident due to the electric leakage of the battery module 200 may be prevented.

Furthermore, referring to FIGS. 4 and 6 again, an auxiliary bumper portion 246 may be further formed in the module case 210. Specifically, the auxiliary bumper portion 246 may be positioned in the space S apart between the bumper portion 240 and the outer wall 210c of the module case 210. In addition, the auxiliary bumper portion 246 may have a plate-shaped part 244a on which a linear rib R3 is formed. The rib R3 of the plate-shaped part 244a may have a shape protruding and extending in the inner direction. However, the auxiliary bumper portion 246 is not provided with the extension part 242 unlike the bumper portion 240. For example, as illustrated in FIGS. 4 and 5, eight auxiliary bumper portions 246 positioned inside the four bumper portions 240 may be formed on the front outer wall 210c of the module case 210.

Moreover, the auxiliary bumper portion 246 may be configured to form a separation space by a predetermined distance between the plate-shaped part 244 of the bumper portion 240 and the auxiliary bumper portion 246. The separation space between the bumper portion 240 and the auxiliary bumper portion 246 may be utilized as a free space that may effectively absorb external impact transferred to the bumper portion 240 and the auxiliary bumper portion 246.

Accordingly, according to this configuration of the present disclosure, by providing the auxiliary bumper portion 246 in the space S apart between the bumper portion 240 and the outer wall 210c of the module case 210, the bumper portion 240 and the auxiliary bumper portion 246 may more effectively absorb external impact applied to the battery module 200. Accordingly, the secondary battery 100 embedded in the battery module 200 is protected from the external impact, thereby effectively preventing fire or explosion.

In addition, referring to FIG. 4 again, at least one support ribs R1 may be formed on the extension part 242 of the bumper portion 240 of the module case 210. Specifically, the support rib R1 may have structure in which a part is connected to each of the extension part 242 and the outer wall 210c of the module case 210. For example, as illustrated in FIG. 4, a plurality of support ribs R1 may be formed in the extension parts 242 of the two bumper portions 240. At this time, the shape of the support rib R1 may be a triangular plate shape.

Accordingly, according to this configuration of the present disclosure, by forming the at least one support ribs R1 on the extension part 242, the bumper portion 240 may fix the extension part 242 not to be easily bent or broken even if an external impact occurs in the bumper portion 240, and thus the defense power of the bumper portion 240 against the external impact may be further increased.

Figure 7:
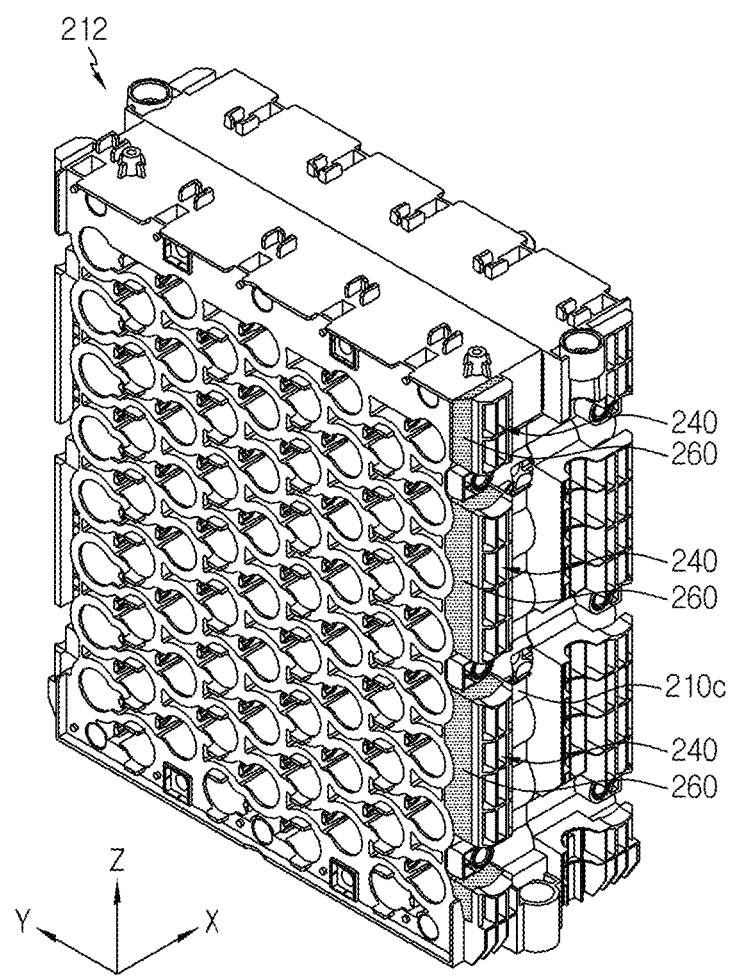
FIG. 7 is a right perspective view schematically showing a module case of a battery module according to another embodiment of the present disclosure.

FIG. 7 is a right perspective view schematically showing a module case of a battery module according to another embodiment of the present disclosure.

Referring to FIG. 7, the module case 212 may further include a buffer pad 260. The buffer pad 260 may have an elastic material. Here, the elastic material may be, for example, synthetic rubber, latex, or silicone-based polymer. The buffer pad 260 may be provided in the separation space between the plate-shaped part 244 of the bumper portion 240 and the outer wall of the module case 212. At this time, the buffer pad 260 may be formed after filling the separation space between the plate-shaped part 244 of the bumper portion 240 and the outer wall of the module case 212 in a liquid form and then cured.

For example, as shown in FIG. 7, four buffer pads 260 may be respectively provided in spaces apart inside four bumper portions 240. The buffer pad 260 may have, for example, at least part of the silicone-based polymer.

Therefore, according to this configuration of the present disclosure, by providing the buffer pad 260 in the separation space between the plate-shaped part 244 of the bumper portion 240 and the outer wall of the module case 212, the module case 212 may absorb and buffer external impact applied to the bumper portion 240, thereby effectively reducing the impact applied to the plurality of secondary batteries 100 accommodated therein.

Figure 8:
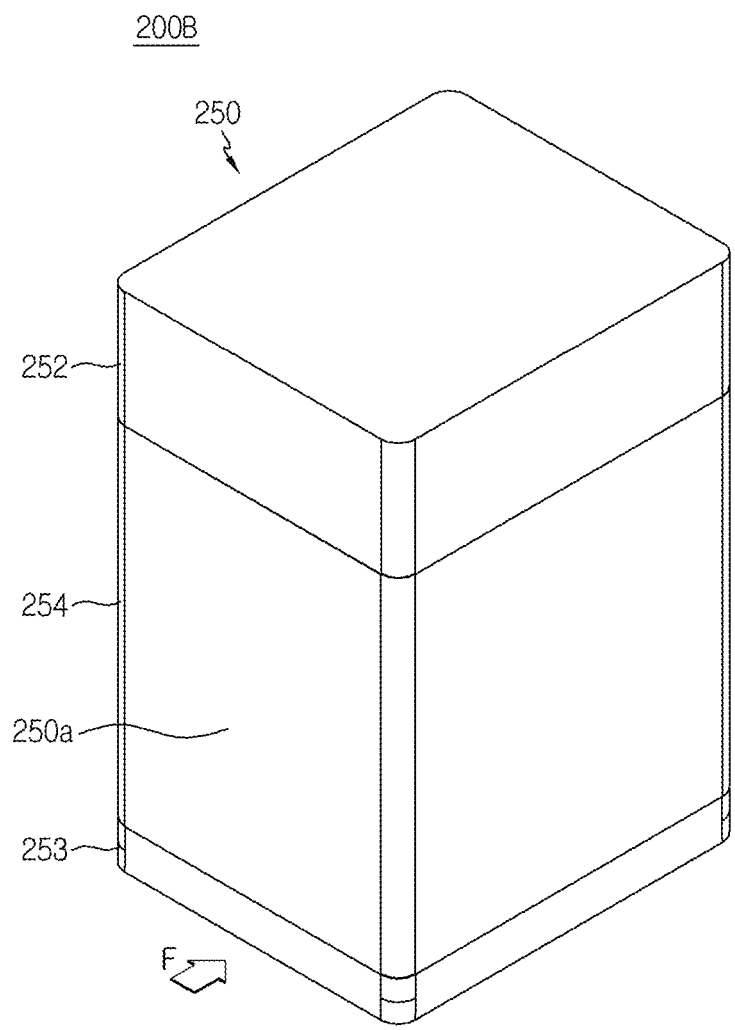
FIG. 8 is a perspective view schematically showing a battery module according to another embodiment of the present disclosure.
Figure 9:
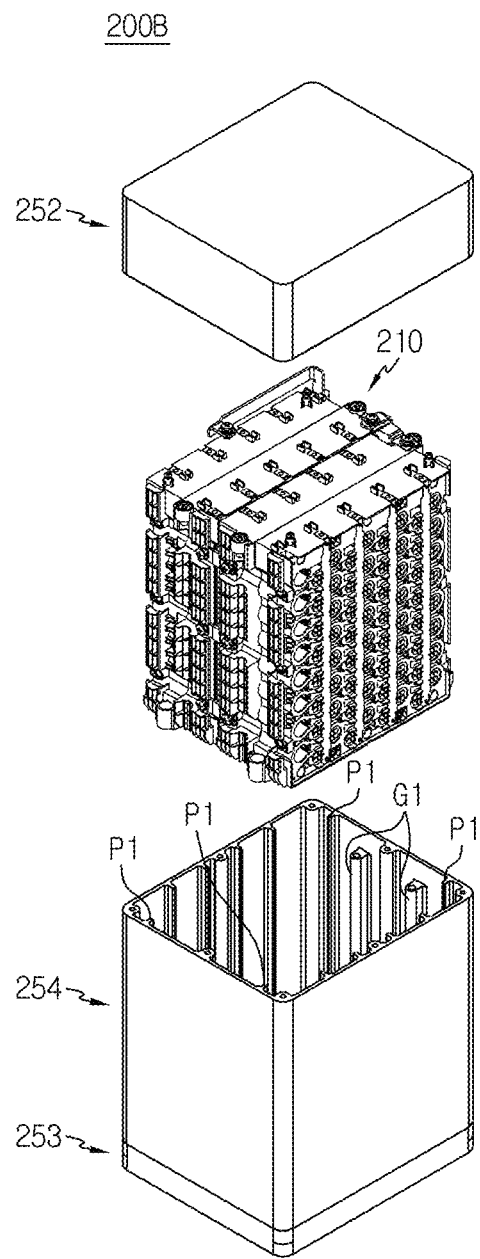
FIG. 9 is an exploded perspective view schematically showing separated internal components of the battery module of FIG. 8.
Figure 10:
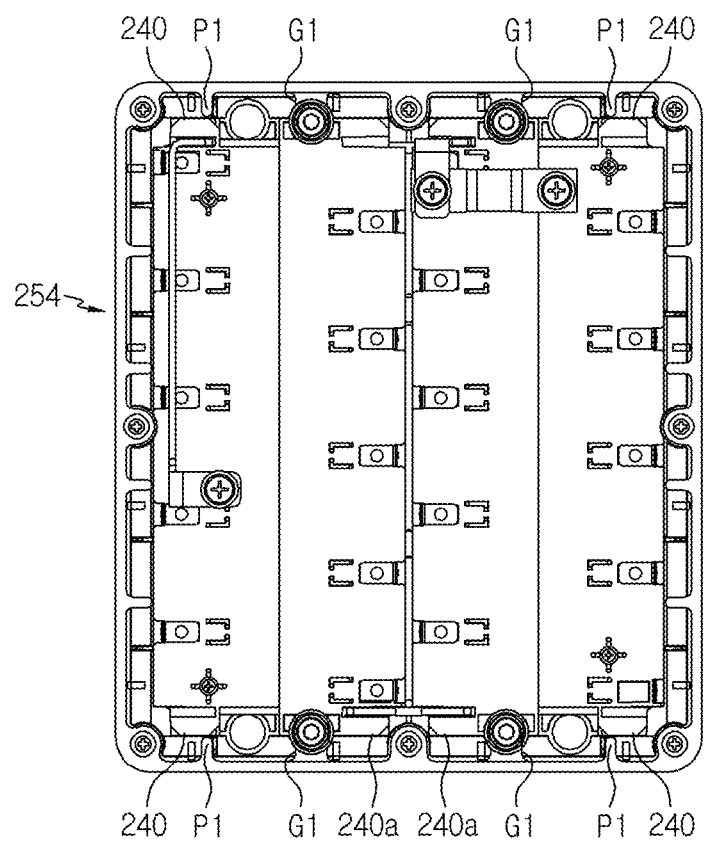
FIG. 10 is a plan view schematically showing some components of the battery module of FIG. 8.

FIG. 8 is a perspective view schematically showing a battery module according to another embodiment of the present disclosure. FIG. 9 is an exploded perspective view schematically showing separated internal components of the battery module of FIG. 8. FIG. 10 is a plan view schematically showing some components of the battery module of FIG. 8.

Referring to FIGS. 8 to 10, the battery pack 200B according to another embodiment of the present disclosure may further include an external housing 250.

Here, the external housing 250 may have a box shape in which an inner space is formed to accommodate the module case 210. Specifically, the external housing 250 may be provided with an outer wall 250a forming a macroscopic hexahedron configured to form the inner space.

In addition, the external housing 250 may include an upper cap 252, an intermediate case 254, and a lower support portion 253. Specifically, when viewed in the F direction, the intermediate case 254 is coupled to the lower portion of the upper cap 252, and the lower support portion 253 may be coupled to the lower portion of the intermediate case 254. More specifically, the upper cap 252 may be provided with an upper wall and a side wall to cover an upper portion of the module case 210 accommodated inside the external housing 250. In addition, the intermediate case 254 may have a square tubular shape opened in the up and down direction. Further, the lower support portion 253 may be a box shape with an open upper portion and provided with a side wall and a lower wall.

In addition, a projection portion P1 may be provided on the inner surface of the external housing 250. Specifically, the projection portion P1 may be formed to protrude and extend in the inner direction from a position corresponding to the bumper portion 240. Moreover, the projection portion P1 may have a shape extending in the up and down direction. For example, as illustrated in FIG. 9, a plurality of projection portions P1 protruding in the inner direction and having the thickness in the horizontal direction gradually decreasing in the protruding direction may be formed on the inner surface of the external housing 250. In addition, some of all the projection portions P1 may be formed in a position corresponding to the bumper portion 240 formed on the outer wall of the module case 210. Furthermore, the projection portion P1 may extend to upper and lower ends of the inner surface of the intermediate case 254.

Accordingly, according to this configuration of the present disclosure, by forming the projection portion P1 protruding and extending in the inner direction in the position corresponding to the bumper portion 240 on the inner surface of the external housing 250, a force transferred according to the external impact applied to the external housing 250 may be induced to be intensively transferred from the projection portion P1 to the bumper portion 240 formed on the outer wall 210c of the module case 210. Accordingly, the present disclosure has an effect capable of effectively reducing an amount of impact transferred to the secondary battery 100 which is an internal component as compared with the case where the external impact is applied to other parts of the outer wall 210c of the module case 210 other than the bumper portion 240.

Referring to FIGS. 8 to 10 again, a guide rail G1 configured to guide the insertion of the module case 210 may be provided on the inner surface of the external housing 250. Specifically, the guide rail G1 may be formed on the inner surface of the intermediate case 254. The guide rail G1 may partially have a circular column shape protruding from the inner surface of the intermediate case 254 in the inner direction and lengthily extending in the up and down direction. That is, the guide rail G1 may extend and protrude from the inner surface of the external housing 250 in the inner direction.

Further, the end portion of the guide rail G1 in the protruding direction may have a curved surface (a convex curved surface in the inner direction) having a circular arc shape on the plane. For example, as illustrated in FIG. 9, four guide rails G1 may be formed on the inner surface of the external housing 250. In addition, the four guide rails G1 may be formed in a position corresponding to the outer wall on which the bumper portion 240 of the module case 210 is formed.

Again, referring to FIGS. 4 and 5 together with FIGS. 9 and 10, in a part of the bumper portion 240, a guide groove 247 configured to be movable in the up and down direction along the guide rail G1 may be formed. Specifically, the guide groove 247 may have a shape indented in the inner direction of the module case 210. More specifically, the guide groove 247 may be indented in a shape corresponding to an outer shape of the guide rail G1 in the protruding direction.

In addition, the guide groove 247 may have the indented shape lengthily extending in the up and down direction. Furthermore, the guide groove 247 may be a part extending from the extension part 242 in the left and right direction. Alternatively, the guide groove 247 may be formed in the left and right sides of the extension part 242. Further, the guide groove 247 may be formed in a position corresponding to the guide rail G1.

For example, as illustrated in FIG. 5, the guide groove 247 may be formed in a part of the two bumper portions 240a respectively formed on the front outer wall 210c1 and the rear outer wall 210c2 of the module case 210. The guide groove 247 may be in a shape concavely indented in the inner direction and lengthily extending in the up and down direction.

Accordingly, according to this configuration of the present disclosure, the guide rail G1 is provided on the inner surface of the external housing 250, and the guide groove 247 is formed on a part of the bumper portion 240, and thus the module case 210 may be easily inserted into the external housing 250, thereby reducing the manufacturing process time. Moreover, the guide rail G1 and the guide groove 247 may effectively reduce the damage to the internal configuration that may occur when misassembled in a process of inserting the module case 210 into the external housing 250. Accordingly, it is possible to effectively improve the manufacturing efficiency of the battery module 200.

Meanwhile, a battery pack (not shown) according to an embodiment of the present disclosure may include at least one battery module 200. Further, the battery pack may further include various devices (not shown) for controlling charging and discharging of the battery module 200, for example, a battery management system (BMS), a current sensor, a fuse, etc.

Meanwhile, an electronic device (not shown) according to an embodiment of the present disclosure includes the at least one battery module 200 described above. The electronic device may further include a device housing (not shown) provided with an accommodation space for accommodating the battery module 200 and a display unit that allows a user to check a state of charging of the battery module 200.

In addition, a battery pack according to an embodiment of the present disclosure may be included in a vehicle such as an electric vehicle or a hybrid vehicle. That is, a vehicle according to an embodiment of the present disclosure may be mounted with the battery pack including at least one battery module 200 according to an embodiment of the present disclosure described above on a vehicle body.

Meanwhile, in the present specification, although the terms indicating directions such as up, down, left, right, front, and back are used, it is apparent to those skilled in the art that these terms are for convenience of explanation only and vary depending on the position of a target object or the position of an observer.

The present disclosure has been described in detail. However, it should be understood that the detailed description and specific examples, while indicating preferred embodiments of the disclosure, are given by way of illustration only, since various changes and modifications within the scope of the disclosure will become apparent to those skilled in the art from this detailed description.

| [Description of Reference Numerals] | |
| --- | --- |
| 200: battery module | 100: can type secondary battery |
| 111, 111a, 111b: electrode terminal, positive electrode terminal, negative electrode terminal | |
| 210: module case | 212, 214: first module case, second module case |
| 212a, 214a: first frame | 212b, 214b: second frame |
| H1: hollow | |
| 220, 225, 227: bus bar, connection bus bar, external bus bar | |
| 223: expansion portion | |
| 240: bumper portion | 242: extension part |
| 244: plate-shaped part | |
| R2, R3: rib | K1: inclined surface |
| 246: auxiliary bumper portion | 260: buffer pad |
| 250: external housing | P1: projection portion |
| G1: guide rail | 247: guide groove |

INDUSTRIAL APPLICABILITY

The present disclosure relates to a battery module including a plurality of can type secondary batteries. Further, the present disclosure is applicable to an industry related to a battery pack including the battery module and a vehicle including the battery pack.

What is claimed is:
1. A battery module comprising:
a plurality of can type secondary batteries arranged to be laid down in a horizontal direction;
a bus bar at least partially formed of an electrically conductive material to electrically connect the plurality of can type secondary batteries; and
a module case having an inner space to accommodate the plurality of can type secondary batteries, the module case comprising an outer wall to surround the inner space and a bumper portion protruding from an outer surface of the outer wall in an outward direction to absorb an external impact wherein the bumper portion comprises:

an extension part protruding and extending from the outer wall of the module case in the outward direction; and a plate-shaped part bent and extending from an end portion of the extension part in an extending direction in a direction corresponding to the outer wall of the module case, wherein a plurality of ribs protruding in the outward direction from the plate-shaped part, and wherein first ones of the plurality of ribs linearly extending in a first direction and second ones of the plurality of ribs linearly extending in a second direction to intersect with the first ones of the plurality of ribs such that plurality of ribs have a lattice shape.

2. The battery module of claim 1, wherein the bumper portion defines a separation space from the outer wall of the module case.

3. The battery module of claim 1, wherein the plate-shaped part includes an inclined surface inclined in an inward direction toward an outer periphery of the module case.

4. The battery module of plate-shaped part, wherein a part of the bus bar is in a separation space between the plate-shaped part of the bumper portion and the outer wall of the module case.

5. The battery module of plate-shaped part, wherein the module case further comprises an auxiliary bumper portion protruding from an outer surface of the outer wall in the outward direction in a separation space between the plate-shaped part of the bumper portion and the outer wall of the module case.

6. The battery module of plate-shaped part, wherein the module case further comprises a buffer pad having an elastic material in a separation space between the plate-shaped part of the bumper portion and the outer wall of the module case.

7. The battery module of claim 1, further comprising: an external housing having a box shape having an inner space therein to accommodate the module case, and having an inner surface provided with a projection portion protruding and extending in the inward direction in a position corresponding to the bumper portion.

8. The battery module of claim 7, wherein a guide rail configured to guide the module case to be inserted into the external housing is provided in the inner surface of the external housing, and wherein a guide groove indented in the inward direction and extending long in an up and down direction to be movable in the up and down direction along the guide rail is in a part of the bumper portion.

9. A battery pack comprising at least one battery module of claim 1.

10. A vehicle comprising at least one battery pack of claim 9.

* * * * *